US009351354B2

(12) United States Patent
Elferich et al.

(10) Patent No.: US 9,351,354 B2
(45) Date of Patent: May 24, 2016

(54) DRIVER DEVICE FOR DRIVING AN LED UNIT

(75) Inventors: Reinhold Elferich, Aachen (DE); Toni Lopez, Kelmis (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 199 days.

(21) Appl. No.: 14/125,775

(22) PCT Filed: Jun. 6, 2012

(86) PCT No.: PCT/IB2012/052841
§ 371 (c)(1),
(2), (4) Date: Dec. 12, 2013

(87) PCT Pub. No.: WO2012/172459
PCT Pub. Date: Dec. 20, 2012

(65) Prior Publication Data
US 2014/0125241 A1    May 8, 2014

(30) Foreign Application Priority Data
Jun. 17, 2011 (EP) ..................................... 11170278

(51) Int. Cl.
*H05B 37/00*         (2006.01)
*H05B 33/08*         (2006.01)
*H02M 3/158*         (2006.01)

(52) U.S. Cl.
CPC ........... *H05B 33/0809* (2013.01); *H02M 3/158* (2013.01); *H05B 33/0815* (2013.01); *H05B 33/0845* (2013.01); *Y02B 20/348* (2013.01)

(58) Field of Classification Search
None
See application file for complete search history.

(56) References Cited

U.S. PATENT DOCUMENTS

| 5,488,269 A * | 1/1996 | El-Hamamsy et al. ....... 315/307 |
| 6,107,753 A * | 8/2000 | Qian ............................. 315/247 |
| 6,198,260 B1 | 3/2001 | Wittenbreder |
| 6,362,575 B1 * | 3/2002 | Chang et al. .................. 315/224 |

(Continued)

FOREIGN PATENT DOCUMENTS

| EP | 2202873 A1 | 6/2010 |
| JP | 2010021109 A | 1/2010 |
| WO | 03022015 A1 | 3/2003 |
| WO | 2009040691 A2 | 4/2009 |

OTHER PUBLICATIONS

Erickson et al, "Design of a Simple High-Power-Factor Rectifier Based on the Flyback Converter", IEEE Proceedings of the Applied Power Electronics Conferences and Expositions, 199, pp. 792-801.

(Continued)

*Primary Examiner* — Tuan T Lam

(57) ABSTRACT

A driver device and a corresponding method for driving a load, in particular an LED unit comprising one or more LEDs. The proposed driver device comprises power input terminals for receiving a rectified supply voltage from an external power supply, power output terminals for providing a drive voltage and/or current for driving a load, a half bridge unit comprising a first and second switching element coupled in series between a high voltage node and a low voltage node and having a switch node between the first and second switching elements, a buck-boost input filter unit comprising a first inductor and a series diode coupled between a power input terminal and the half bridge unit, a buck output filter unit comprising a second inductor coupled between the half bridge unit and a power output terminal, an energy storage unit, and a control unit for controlling the switching elements.

8 Claims, 12 Drawing Sheets

(56) References Cited

U.S. PATENT DOCUMENTS

| | | | |
|---|---|---|---|
| 2006/0103363 A1 | 5/2006 | Miftakhutdinov | |
| 2006/0273737 A1* | 12/2006 | Heckmann | 315/209 R |
| 2010/0296324 A1 | 11/2010 | Boeke | |
| 2011/0089846 A1* | 4/2011 | Ido | 315/209 R |
| 2012/0306395 A1* | 12/2012 | Hirsch et al. | 315/200 R |
| 2013/0033177 A1* | 2/2013 | Rooijackers et al. | 315/85 |
| 2013/0127357 A1* | 5/2013 | Wu | 315/200 R |
| 2013/0181625 A1* | 7/2013 | Pan et al. | 315/200 R |
| 2014/0117878 A1* | 5/2014 | Prodic et al. | 315/307 |

OTHER PUBLICATIONS

Chi, "Zero-Order Switching Networks and Their Applications to Power Factor Correction in Switching Converters", IEEE Transactions on Circuits and Systems—I: Fundamental Theory and Applications, Vol. 44, No. 8, Aug. 1997, pp. 667-675.

Venkatraman et al, "A Soft-Switching Single-Stage AC-To-DC Converter With Low Harmonic Distortion—Analysis, Design, Simulation and Experimental Results", IEEE Transaction on Aerospace and Electronic Systems, Vol. 36, No. 4 Oct. 1, 2000, pp. 662-668.

* cited by examiner

DRIVER DEVICE FOR DRIVING AN LED UNIT

FIELD OF THE INVENTION

The present invention relates to driver device for driving a load, in particular an LED unit comprising one or more LEDs. Further, the present invention relates to a light apparatus.

BACKGROUND OF THE INVENTION

In the field of LED drivers for offline applications such as retrofit lamps, solutions are demanded to cope with high efficiency, high power density, long lifetime, high power factor and low cost, among other relevant features. While practically all existing solutions compromise one or the other requirement, it is essential that the proposed driver circuits properly condition the form of the mains power into the form required by the LEDs while keeping compliance with present and future power mains regulations. Of critical importance is to guarantee a maximum light perceptible flicker (preferably zero) at the same time that the power factor is maintained above a certain limit.

Further, in off-line converters, energy from the power mains often needs to be synchronously drawn in proportion to the supplied voltage waveform in order to achieve high power factor and low harmonic distortion. Power converter architectures with an independent preconditioner stage are traditionally employed to best accomplish this task without compromising the proper form of the energy to be delivered to the load.

Typically, two series connected power stages are employed to obtain high power factor while keeping the output power constant throughout a mains cycle (or supply cycle, i.e. the cycle of the mains voltage or the supply voltage). In those architectures the first stage shapes the mains' current and the second stage performs the power conversion to the load.

Nonetheless, for reasons related to complexity and cost, simplified powertrain solutions are adopted known conventionally as single-stage, where either of the two stages may essentially not be incorporated. As a consequence of such simplification, the aforementioned requirements may be largely compromised and/or the converter performance highly degraded, particularly in terms of size, reliability and lifetime. The latter is usually mainly attributed to the need of using a bulky low frequency storage capacitor in parallel to the load when constant output power delivery is to be guaranteed.

Single stage solutions are common in literature. One reference example is given in the work of Robert Erickson and Michael Madigan, entitled "Design of a simple high-power-factor rectifier based on the flyback converter", IEEE Proceedings of the Applied Power Electronics Conferences and Expositions, 1990, pp. 792-801.

An intermediate solution laying half-way between the two-stage and single-stage approaches is the single-stage converter with integrated preconditioner. Such solutions can feature reduced component count and high power density while keeping compliance with both load and power mains requirements. Other embodiments with a single power converting stage allow high power factors (HPF) by means of integrating a boost converter operating in discontinuous conduction mode. These converters actually combine the above mentioned two power conversion stages.

A HPF converter for compact fluorescent lamps is described in "High-Power-Factor Electronic Ballast with Constant DC-Link Voltage", by Ricardo de Oliveira Brioschi and José Luiz F. Vieira, IEEE Transactions on Power Electronics, vol. 13, no. 6, 1998. Here, a half bridge is shared by a boost converter and an LC parallel resonant converter, which is operated above resonance in order to obtain zero voltage switching (ZVS). To further support ZVS the bus voltage is controlled constant. Such a HPF converter, however, typically requires a large bus capacitor and an output rectifier and has only narrow supply voltage and load (drive) voltage ranges.

Another example of integrated power stages is the work of R. Venkatraman, A. K. S. Bhat and Mark Edmunds, entitled "Soft-switching single-stage AC-to-DC converter with low harmonic distortion", IEEE Transaction on Aerospace and Electronic Systems, vol.36, no.4, October 2000. In this work, a high frequency transformer isolated, Zero Voltage Switching (ZVS), single stage AC-DC converter with high power factor and low harmonic distortion is presented and analyzed for a constant power load.

SUMMARY OF THE INVENTION

It is an object of the present invention to provide a driver device for driving a load, in particular an LED unit comprising one or more LEDs, particularly providing a high power factor, a virtually constant load, small size, high efficiency, long lifetime and low cost. Further, it is an object of the present invention to provide a corresponding light apparatus.

According to an aspect of the present invention a driver device is provided comprising:
  power input terminals for receiving a rectified supply voltage from an external power supply,
  power output terminals for providing a drive voltage and/or current for driving a load,
  a half bridge unit comprising a first and second switching element coupled in series between a high voltage node and a low voltage node and having a switch node (59) between said first and second switching elements,
  a buck-boost input filter unit comprising a first inductor and a series diode coupled between a power input terminal and said half bridge unit,
  a buck output filter unit comprising a second inductor coupled between said half bridge unit and a power output terminal,
  an energy storage unit, and
  a control unit for controlling said switching elements.

According to another aspect of the present invention a light apparatus is provided comprising a light assembly comprising one or more light units, in particular an LED unit comprising one or more LEDs, and a driver device for driving said light assembly as provided according to the present invention.

Preferred embodiments of the invention are defined in the dependent claims. It shall be understood that the claimed light apparatus has similar and/or identical preferred embodiments as the claimed device and as defined in the dependent claims.

The present invention is based on the idea to integrate and control a buck-boost converter into a synchronous buck converter. To the power output terminals a load (e.g. a HV LED unit) is connected. Further, to the power input terminals a mains filter capacitor is preferably connected. In this way, the present invention provides both a constant drive current and power factors of 0.9 or higher.

Compared to two-stage offline drivers for LEDs the problems of high cost, complexity and large component count, which are needed to keep compliance with the requirements of both power mains and load, are addressed and solved since the proposed driver device and method feature simplicity and reduced component count, wherein preferably conventional components are used.

Compared to single-stage offline drivers for LEDs the following problems are addressed. A large low frequency capacitor can be omitted by allowing a smaller low frequency storage capacitor voltage vary during the supply cycle or mains cycle (e.g. 20 . . . 80%) still while keeping the output current constant. This in turn translates into smaller size, longer lifetime and more reliable, particularly at high temperature operation. Further, reduced component count is needed compromising the requirements of neither power mains nor load. This is achieved intrinsically by the operation of the power stage with integrated preconditioning function. Still further, an increased converter efficiency, typically limited in most single-stage solutions, particularly for retrofit bulb lighting applications, can be achieved, particularly by virtue of ZVS (Zero Voltage Switching) operation as proposed in a preferred embodiment. Finally, even with the use of a large low frequency storage capacitor, single stages may not fully eliminate perceptive flicker. The proposed solution enables constant output current and hence perceptive flicker can be completely avoided.

According to the present invention there are various basic configurations of the buck-boost integrated synchronous buck converter provided as different preferred embodiments that cope with various load and input voltage ranges. All of them can be controlled over full load range down to virtually zero load current by means of manipulating the duty cycle only or the switching frequency or by burst mode operation.

The supply voltage may be a rectified periodic supply voltage provided by a power supply. In case an AC mains voltage is provided as input voltage to the power supply (or the power input terminals), e.g. from a mains voltage supply, a rectifier unit is preferably used (as part of the driver device or as an external unit coupled to the power input terminals) for rectifying a provided AC input voltage, e.g. a mains voltage, into the (rectified periodic) supply voltage. Such a rectifier unit may, for instance, comprise a generally known half-bridge or full-bridge rectifier. The supply voltage thus has the same polarity for either polarity of the AC input voltage.

Alternatively, if e.g. such a rectified periodic supply voltage is already provided at the power input terminals, e.g. from a rectifier (representing said external power supply) provided elsewhere, no further or only general elements (like e.g. an amplifier) are coupled to the power input terminals for shaping the provided supply voltage.

There are various embodiment of the proposed driver device which distinguish mainly by the coupling of the various elements of the driver device.

In one embodiment a high power input terminal is coupled to the high power terminal of the half bridge unit and a low power input terminal is coupled to the buck-boost input filter unit. Preferably, in this embodiment the input terminal of said buck-boost input filter unit is coupled to the low power input terminal and wherein the output terminals of said buck-boost input filter unit are coupled to the intermediate node of the half bridge unit and either the energy storage unit or the high power output terminal.

In another embodiment a low power input terminal is coupled to the low voltage node of the half bridge unit and a high power input terminal is coupled to the buck-boost input filter unit. Preferably, in this embodiment the input terminal of said buck-boost input filter unit is coupled to the energy storage unit or the low power output terminal and wherein the output terminals of said buck-boost input filter unit are coupled to the intermediate node of the half bridge unit and the high power input terminal.

For the coupling of the energy storage unit various embodiments exist. For instance, in one embodiment said energy storage unit is coupled between a low power input terminal and said low voltage node of said half bridge unit, while in a different embodiment said energy storage unit is coupled between a high power input terminal and said high voltage node of said half bridge unit. In still another embodiment said energy storage unit is coupled between output terminals of said buck output filter unit.

The various embodiments are provided for use in different applications and different voltages, and are directed to achieve certain aims. Often, a trade-off is to be made to select the optimum embodiment.

Said energy storage unit comprises a charge capacitor, in particular a single capacitor.

Advantageously, an input decoupling capacitor coupled between the power input terminals and/or an output decoupling capacitor coupled between the power output terminals are additionally provided for high frequency decoupling. Particularly, the input decoupling capacitor is advantageous if the rectified supply current must go negative as is the case in some embodiments.

The switching elements together form a half bridge (also called switching unit) in one embodiment. But generally, the switching elements can be implemented in various ways, e.g. including transistors (e.g. MOSFETs) or other controlled switching means.

Preferably, the control unit is adapted for keeping the output current constant, to keep the voltage across the energy storage element below a predetermined threshold and/or to shape the input current. Zero voltage switching of the switching elements is arranged for by the design (components) of the proposed driver device. The tasks of the control are keeping the output current constant; possibly according to a reference current (set point), to keep the bus voltage (i.e. the voltage across the energy storage element) below a preset limit and/or to shape the input current.

BRIEF DESCRIPTION OF THE DRAWINGS

These and other aspects of the invention will be apparent from and elucidated with reference to the embodiment(s) described hereinafter.

In the following drawings.

DETAILED DESCRIPTION OF THE INVENTION

Figure 1:
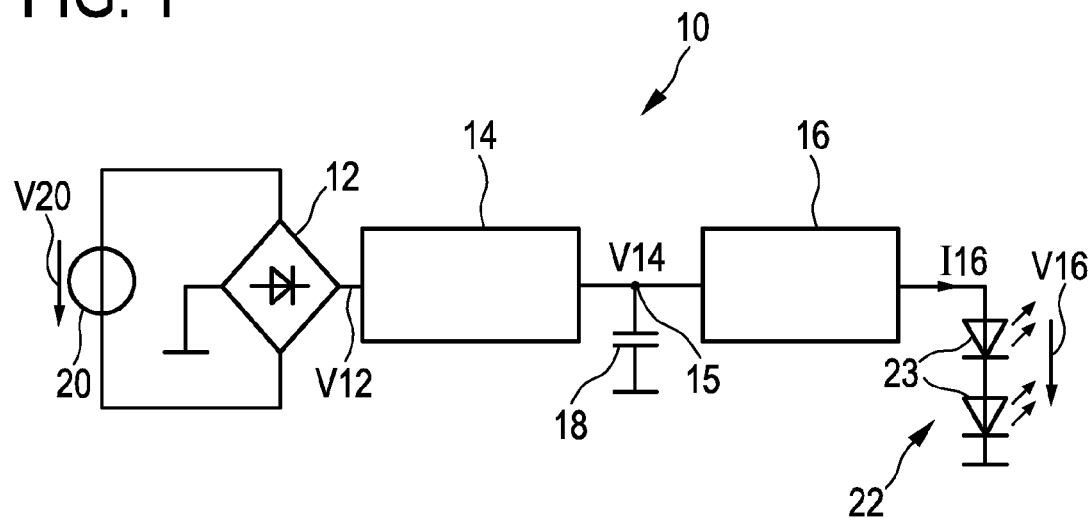
FIG. 1 shows a schematic block diagram of a known two stage driver device.

An embodiment of a known two stage driver device 10 is schematically shown in FIG. 1. Said driver device 10 comprises a rectifier unit 12, a first stage preconditioning unit 14 coupled to the output of the rectifier unit 12, a second stage conversion unit 16 coupled to the output of the first stage preconditioning unit 14 and a charge capacitor 18 coupled to the node 15 between said first stage preconditioning unit 14 and said second stage conversion unit 16. The rectifier unit 12 preferably comprises a rectifier unit, such as a known full-wave bridge or half-wave bridge rectifier, for rectifying an AC input voltage V20 provided, e.g., from an external mains voltage supply 20 into a rectified voltage V12. Load 22 is, in this embodiment, an LED unit comprising two LEDs 23 is coupled to the output of the second stage conversion unit 16 whose output signal, in particular its drive voltage V16 and its drive current I16, is used to drive the load 22.

The first stage preconditioning unit 14 preconditions the rectified voltage V12 into an intermediate DC voltage V14, and the second stage conversion unit 16 converts said intermediate DC voltage V14 into the desired DC drive voltage V16. The charge capacitor 18 is provided to store a charge, i.e. is charged from the intermediate DC voltage V14, thereby filtering the low frequency signal of the rectified voltage V12 to ensure a substantially constant output power of the second stage conversion unit 16, in particular a constant drive current I16 through the load 22. These elements 14, 16, 18 are generally known and widely used in such driver devices 10 and thus shall not be described in more detail here.

Figure 2A:
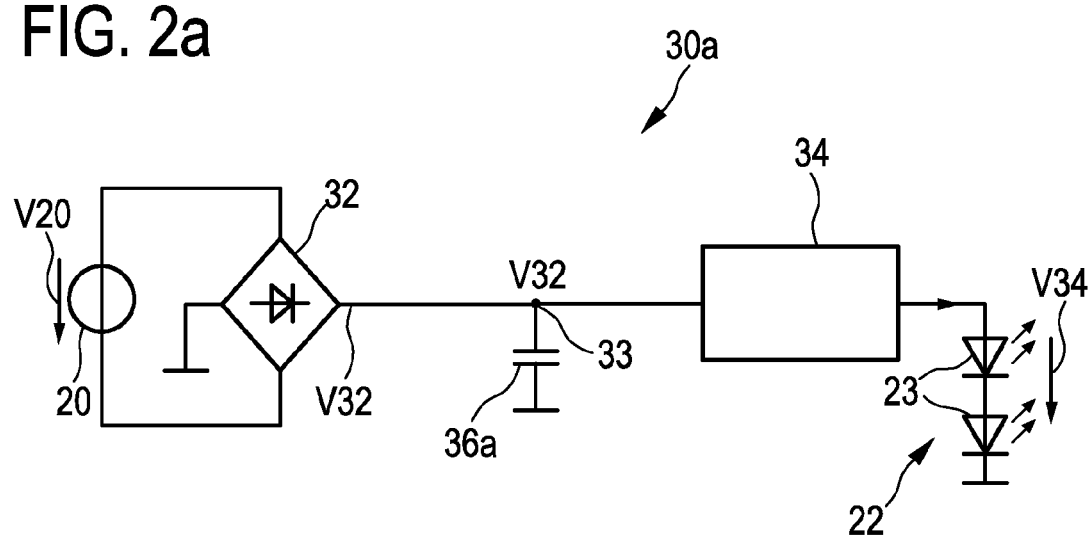
FIG. 2a shows a schematic block diagram of a known single stage driver device with input storage capacitor.
Figure 2B:
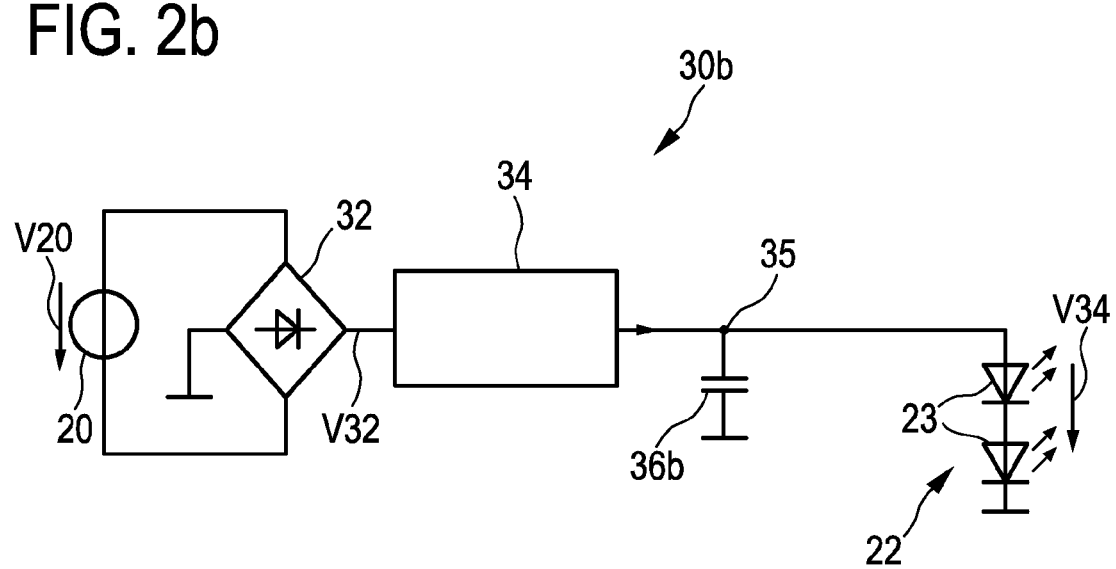
FIG. 2b shows a schematic block diagram of a known single stage driver device with output storage capacitor.

Generally, the driver device 10 complies with the aforementioned demand of high power factor and low flicker at the expense of larger space requirements and cost, which might be drastically limited particularly in retrofit applications. The size of the first stage preconditioning unit 14 may be mainly determined by the associated passive components, particularly if it comprises a switched mode power supply (SMPS), e.g. a boost converter, operating at low or moderated switching frequency. Any attempt to increase the switching frequency so as to reduce the size of these filter components may yield a rapid increase of energy losses in the hard-switched SMPS and hence the need of use of larger heat sinks Embodiments of known single stage driver devices 30a, 30b are schematically shown in FIG. 2a and FIG. 2b. Said driver device 30 comprises a rectifier unit 32 (that may be identical to the rectifier unit 12 of the two stage driver device 10 shown in FIG. 1) and a conversion unit 34 (e.g. flyback converter for the embodiment shown in FIG. 2b or a buck converter for the embodiment shown in FIG. 2a) coupled to the output of the rectifier unit 32. Further, in the embodiment shown in FIG. 2a a charge capacitor 36a (representing a low frequency input storage capacitor) is coupled to the node 33 between said rectifier unit 32 and said conversion unit 34 is provided. In the embodiment shown in FIG. 2b the charge capacitor 36b (representing a low frequency output storage capacitor) is coupled to the node 35 between said conversion unit 34 and the load 22. The rectifier unit rectifies an AC input voltage V20 provided, e.g., from an external mains voltage supply (also called power supply) 20 into a rectified voltage V32. The rectified voltage V32 is converted into the desired DC drive voltage V34 for driving the load 22.

The storage capacitors 18 (in FIG. 1) and 36a, 36b (in FIGS. 2a, 2b) are mainly provided to filter out the low frequency component of the rectified voltage V12 in order to allow for a constant current into the load. Such capacitors are therefore large, particularly when placed in parallel to the load and when such load is an LED.

Driver devices as shown in FIGS. 1 and 2 are, for instance, described in Robert Erickson and Michael Madigan, "Design of a simple high-power-factor rectifier based on the flyback converter", IEEE Proceedings of the Applied Power Electronics Conferences and Expositions, 1990, pp. 792-801.

Most of those single stage driver devices 30a, b can, although featuring a lower number of hardware components compared to two stage driver devices as exemplarily shown in FIG. 1, generally not offer a high power factor and a low perceptible flicker simultaneously due to limitations in the size of the charge capacitor, which must filter out the low frequency component of the AC input voltage. In addition, single stage driver devices may critically compromise size, lifetime and the maximum temperature operation of the load (e.g. a lamp) due to the use of large storage capacitors used to mitigate perceptible flicker.

FIGS. 3 to 5 depict several embodiments of three different basic configurations of a driver device according to the present invention. Each configuration (embodiments of configuration 1 being shown in FIG. 3, embodiments of configuration 2 being shown in FIG. 4, embodiments of configuration 3 being shown in FIG. 5) is represented by two different embodiments of the proposed driver device including a buck-boost integrated buck converter. The embodiments of each configuration are used for connecting the rectified supply voltage to either a first (top) switching element or to a second (bottom) switching element. The configurations differ in operation in terms of the in- and output voltage range they support, as well in terms of their component stress regarding peak voltage and RMS currents.

All three configurations show a self-stabilizing behaviour, which allows controlling the output current constant at predetermined voltage ripple across the (low frequency) energy storage unit (e.g. storage capacitor). The boost inductor (i.e. the first inductor Lm of the buck-boost input filter unit) is designed for discontinuous conduction mode, for which purpose an additional diode (Dm) is preferably coupled in series to said boost inductor. Further, ZVS is possible for both switching elements and both transitions of the switching element series coupling (i.e. switching elements 60, 61 forming a halfbridge unit), which is determined by the buck inductor (i.e. the second inductor Lo or Lc of the buck output filter unit). Still further, all configurations are suitable for high voltage loads, e.g. high voltage strings of LEDs. The embodiment of type 1 (i.e. the embodiments shown in FIGS. 3a, 4a, 5a) and of type 2 (i.e. the embodiments shown in FIGS. 3b, 4b, 5b) within each configuration are thus to a large extent equivalent, for which reason mainly the embodiments of type 1 will mainly be described in the following.

Figure 3A:
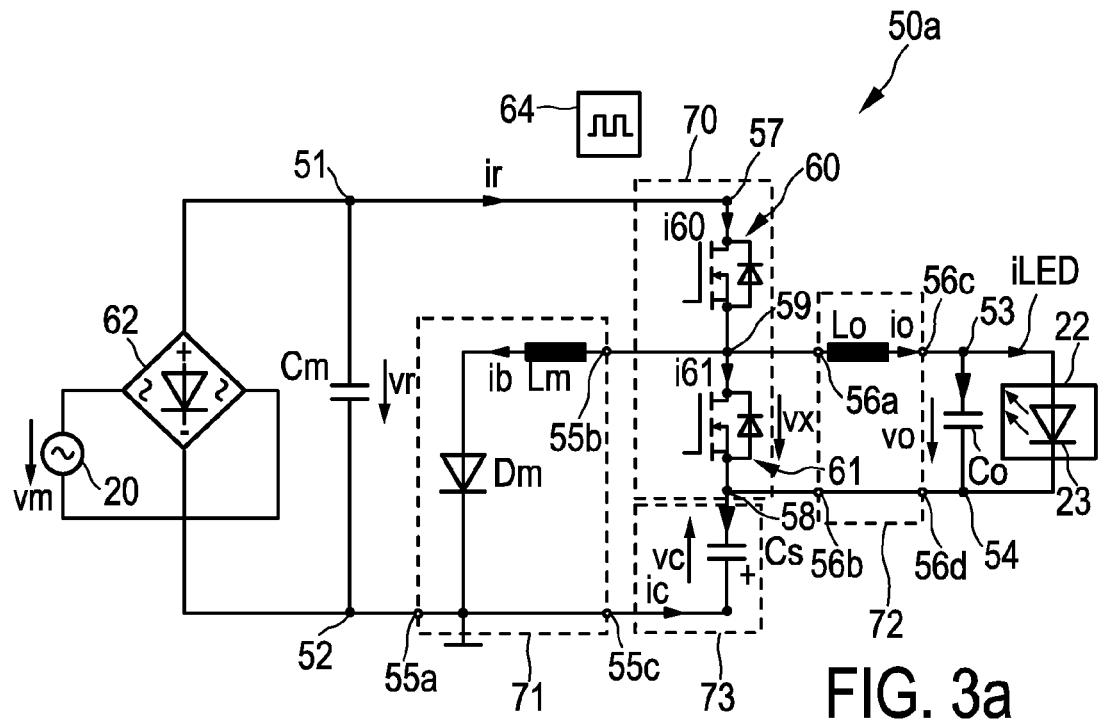
FIG. 3 shows schematic block diagrams of two embodiments of a first configuration of a driver device according to the present invention.
Figure 3B:
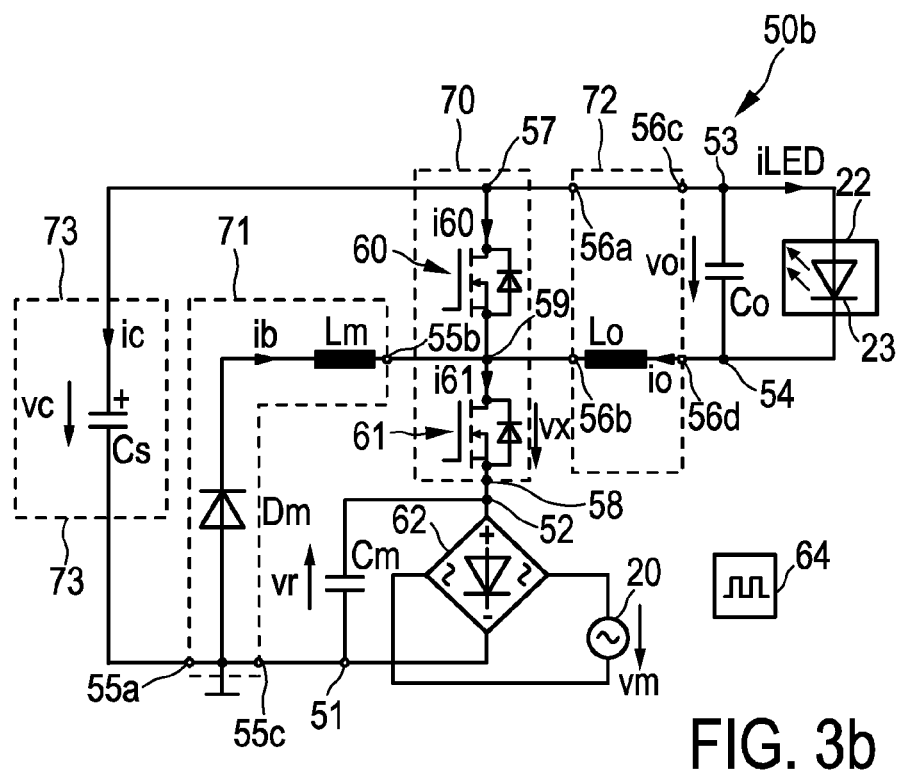
Figure 4A:
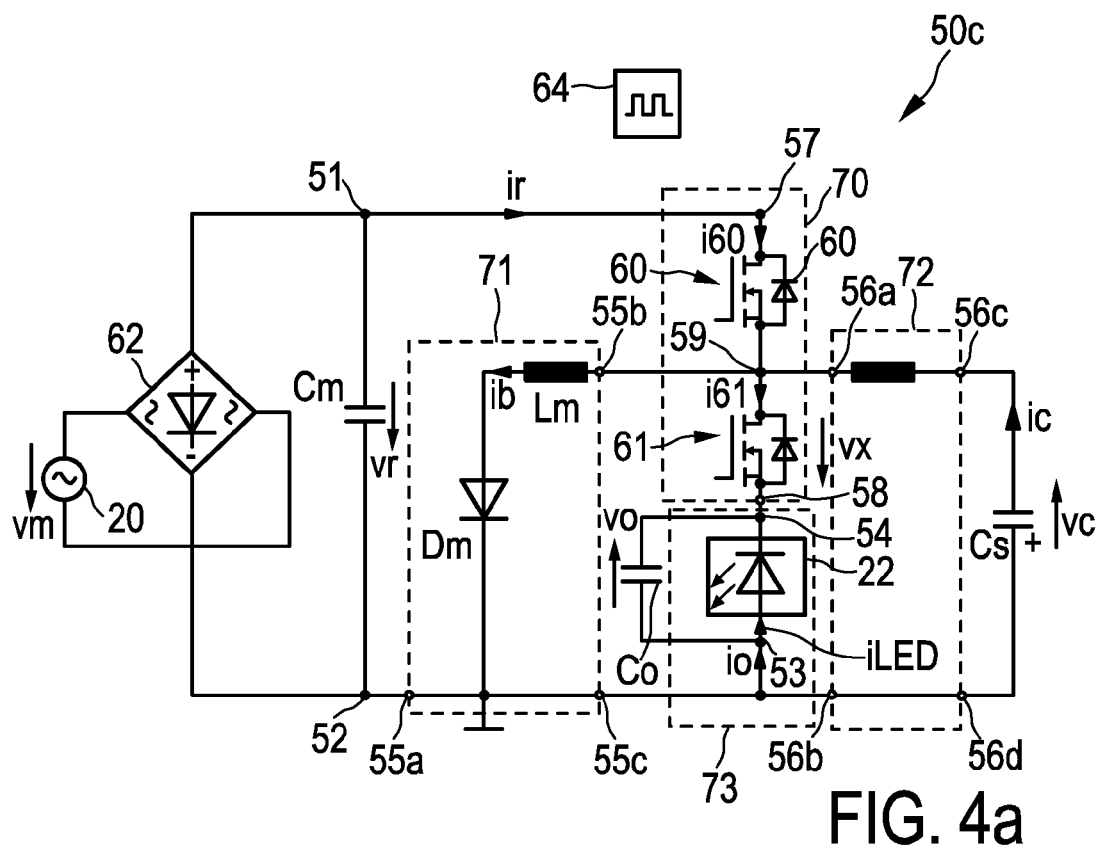
FIG. 4 shows schematic block diagrams of two embodiment of a second configuration of a driver device according to the present invention.
Figure 4B:
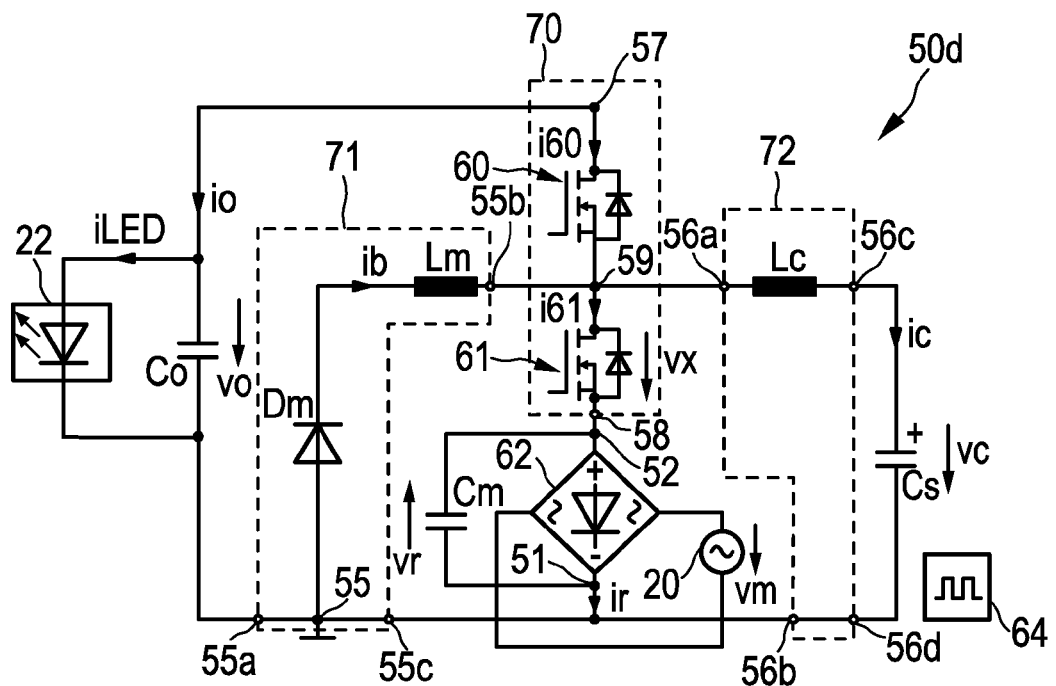
Figure 5A:
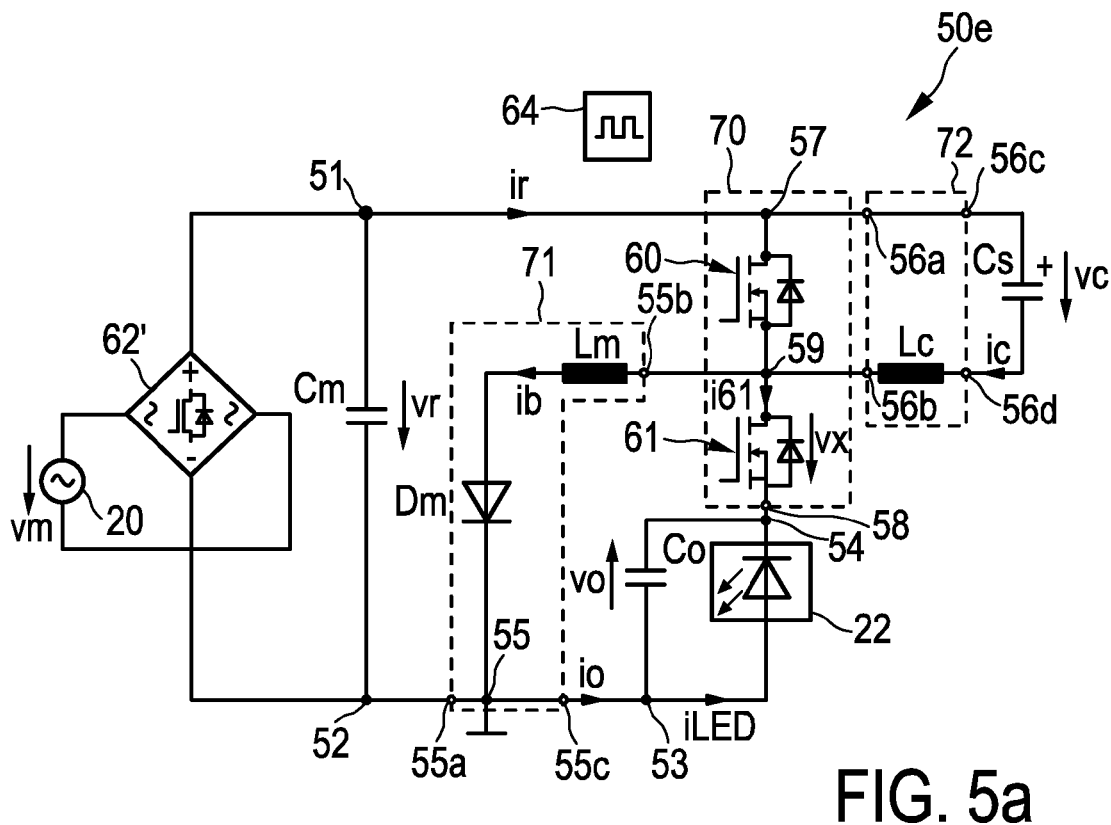
FIG. 5 shows schematic block diagrams of two embodiment of a third configuration of a driver device according to the present invention.
Figure 5B:
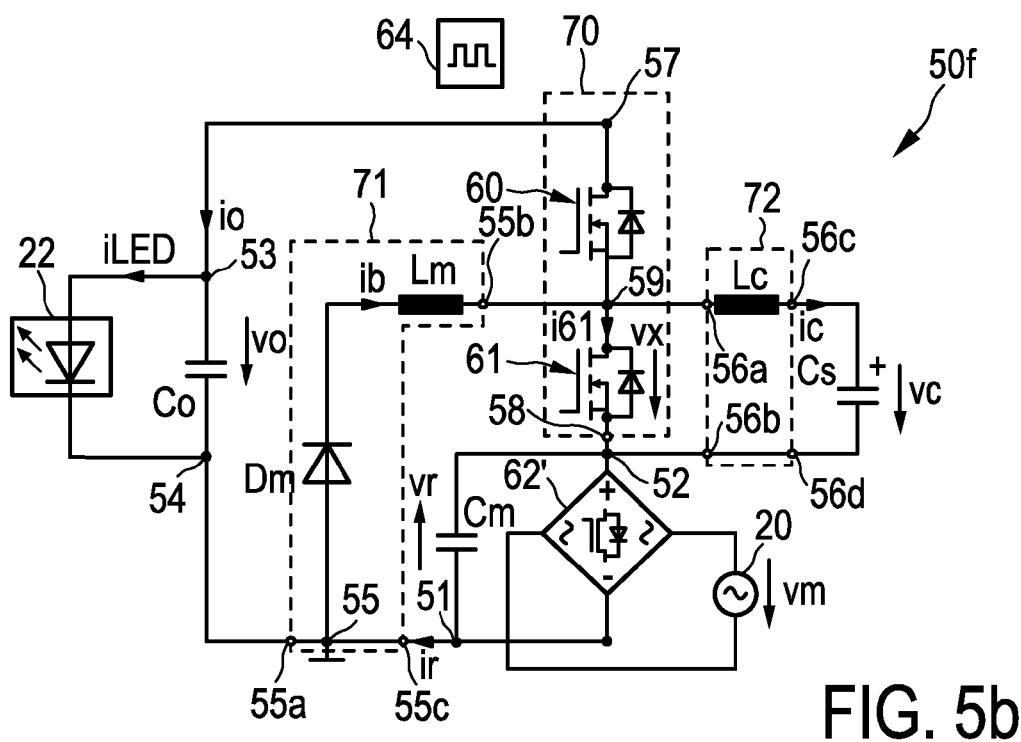

The diagrams shown in FIGS. 6 to 11 refer to the three configurations shown in FIGS. 3, 4 and 5. They illustrate both low frequency steady-state waveforms (FIGS. 6, 8, 10) and high frequency switching waveforms (FIGS. 7, 9, 11) of the first, third and fifth embodiments shown in FIGS. 3a, 4a, 5a. In all cases, an LED load including a series connection of LED units is chosen to operate at 10 W constant power, meaning that the output current must be constant. The rectified AC input signal refers to the European mains. Other type of loads and power supplies are possible as well. In all illustrated embodiments herein, the resulting power factor (or PF) is higher than or equal to 90%, whereas the total harmonic distortion (or THD) is lower than 50%.

It should be noted that the duty cycle refers to the first (top) switching element 60, e.g. 100% duty cycle implies that the first (top) switching element 60 is always on (closed) whereas the second (bottom) switch 61 is always off (open).

A first embodiment of a driver device 50a according to the present invention is schematically shown in FIG. 3a. It comprises power input terminals 51, 52 for receiving a rectified supply voltage vr from an external power supply 20 (e.g. a mains voltage supply providing a mains voltage vm) which is preferably rectified by a rectifier 62. The driver device 50a further comprises power output terminals 53, 54 for providing a drive voltage vo and/or current io for driving a load 22.

A half bridge unit 70 (also called switching unit or half bridge) comprising a first 60 and second 61 switching element is coupled in series between a high voltage node 57 and a low voltage node 58 and forms a switch node 59 between said first and second switching elements 60, 61. A buck-boost input filter unit 71, comprising a first inductor Lm and a series diode Dm coupled in series to the first inductor Lm, is coupled between a power input terminal, here the low power input terminal 52 and said half bridge unit 70. A buck output filter unit 72 comprising a second inductor Lo is coupled between said half bridge unit 70 and a power output terminal, here the low power output terminal 54.

In this embodiment the output terminals 55b, 55c of the buck-boost input filter unit 71 are coupled to the intermediate node 59 and an energy storage unit 73 (which is preferably a single storage capacitor Cs), which in turn is coupled the low voltage node 58 of the half bridge unit 70. The input terminals 56a, 56b of the buck output filter unit 72 are coupled to the intermediate node 59 and the low voltage node 58 of the half bridge unit 70. The output terminals 56c, 56d of the buck output filter unit 72 are coupled to the power output terminals 53, 54. The high power input terminal 51 is coupled to the high voltage node 57 of the half bridge unit 70. The low power input terminal 52 as well as the input terminal 55a and the output terminal 55c of the buck-boost input filter unit 71 are coupled to a reference potential, preferably ground potential.

A control unit 64 (e.g. a controller, processor or computer that is appropriately designed or programmed) is provided for controlling said switching elements 60, 61.

For high frequency decoupling an (optional) input decoupling capacitor Cm coupled between the power input terminals 51, 52 and an (optional) output decoupling capacitor Co coupled between the power output terminals 53, 54 are additionally provided in this embodiment. Preferably the input decoupling capacitor Cm is used if the rectified supply current must go negative as is the case in some embodiments (as e.g. shown in FIG. 7).

A second embodiment of a driver device 50b according to the present invention is schematically shown in FIG. 3b. Compared to the first embodiment of the driver device 50a the energy storage unit 70 is coupled between the high power input terminal 51 and the high voltage node 57 of said half bridge unit 70. Further, in this embodiment the low power input terminal 52 is coupled to the low voltage node 58 of the half bridge unit 70 and a high power input terminal 51 is coupled to the buck-boost input filter unit 71. Still further, the input terminal 55a of said buck-boost input filter unit 71 is coupled to the energy storage unit 73 and the output terminals 55b, 55c of said buck-boost input filter unit 71 are coupled to the intermediate node 59 of the half bridge unit 70 and the high power input terminal 51. The high power input terminal 51 as well as the input terminal 55a and the output terminal 55c of the buck-boost input filter unit 71 are coupled to a reference potential, preferably ground potential, in this embodiment.

According to the first and second embodiments of the driver device 50a, 50b the low frequency storage capacitor Cs is connected at the output of the buck-boost converter, formed essentially by the first inductor Lm, diode Dm, and the two switching elements 60, 61, i.e. between the source electrode of the bottom switch 61 and ground. The load 22 is connected at the output of the buck converter, formed essentially by the second inductor Lo and the two switching elements 60, 61, i.e. in parallel to the capacitor Co and in series to the inductor Lo, which operates in bidirectional mode, thereby enabling full ZVS operation in both switches.

Figure 6:
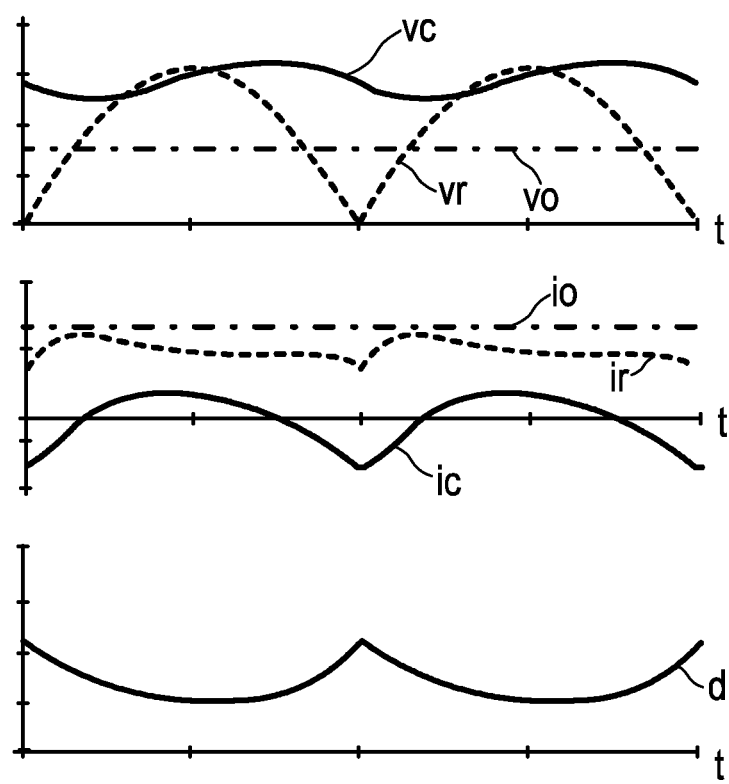
FIG. 6 shows diagrams of voltages and currents during one low frequency cycle in an embodiment of the first configuration of the proposed driver device.
Figure 7:
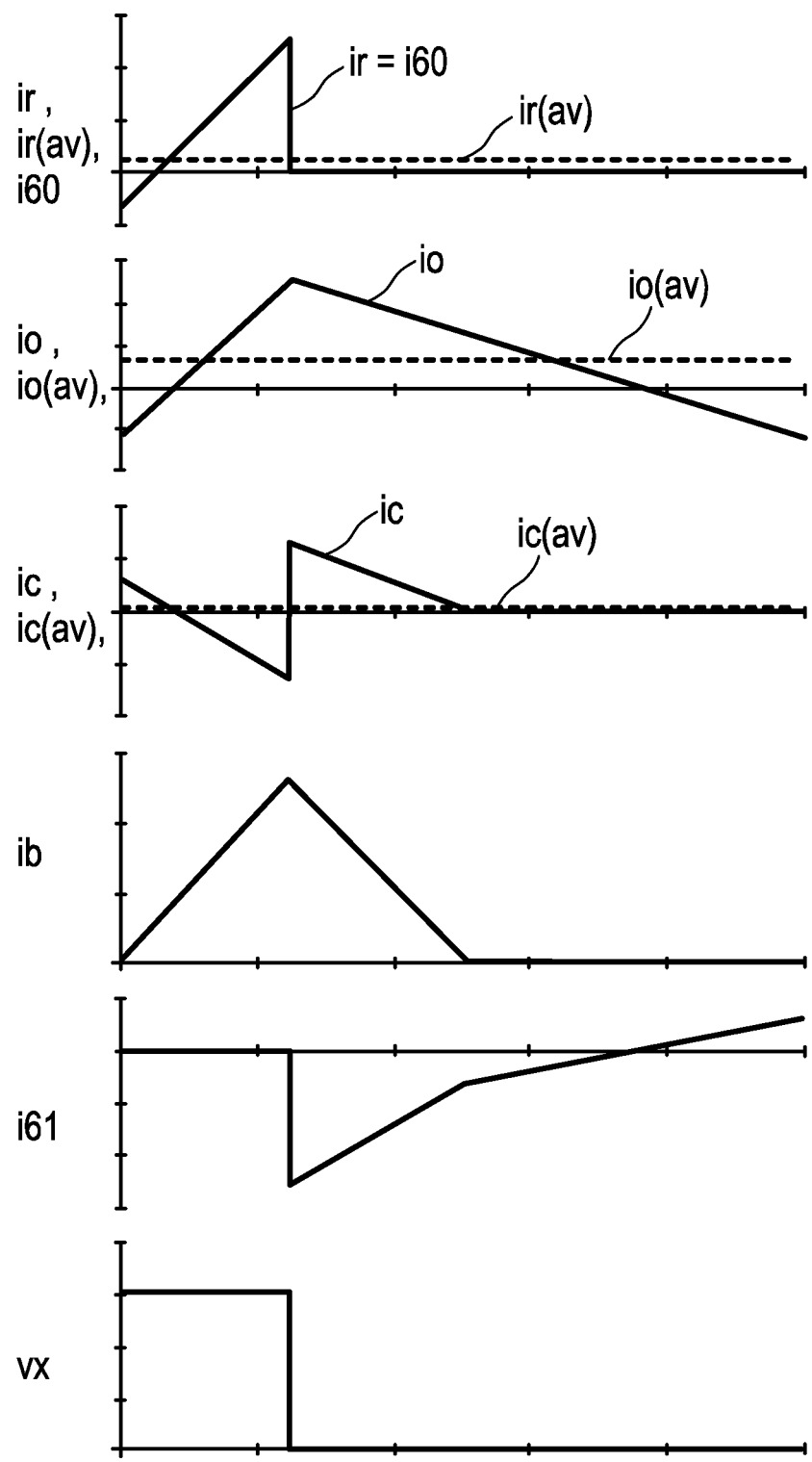
FIG. 7 shows diagrams of various currents during one high frequency cycle in an embodiment of the first configuration of the proposed driver device.

FIGS. 6 and 7 show signal diagrams of the first embodiment of a driver device 50a as shown in FIG. 3a during one mains cycle. For the example of the steady-state waveforms shown in FIG. 6 and the high-frequency waveforms at phase angle π/2 from mains cycle shown in FIG. 7 the following values apply: vm=220 Veff, 50 Hz, 1 MHz switching frequency, Lm=Lo=300 μH, Po=10 W, vo=150V, Cs=1 μF, PF=90%, THD=47%, maximum voltage stress across switches=632V. The term "av" refers to the average component over a switching cycle. d indicates the duty cycle.

The ZVS operation is shown in the high frequency switching waveforms of depicted in FIG. 7 for the case of π/2 phase angle corresponding to the mains cycle. Capacitors Cm and Co filter these high switching frequency signals to prevent them at the input and output, respectively. The maximum voltage stress across the switches is the sum of both the rectified supply voltage vr and the storage capacitor voltage vc.

As depicted in FIG. 6, this configuration is characterized by the use of low frequency storage capacitors rated to a voltage that is at least higher than the rectified supply voltage peak. Such capacitors can be as low as 1 μF (i.e. 100 nF/W) and still guarantee a constant output power and a high power factor. By virtue of the step-down conversion, the load voltage can be substantially lower than the supply peak voltage (e.g. 150V in case of European mains supply). The rectified input current it never falls to zero due to the continuous current flow from the input voltage supply vm directly to the load 22.

A third embodiment of a driver device 50c according to the present invention is schematically shown in FIG. 4a. This embodiment is substantially identical to the embodiment of the driver device 50a, but here in this embodiment the position of load 22 (together with the output decoupling capacitor Co) is exchanged with the position of the energy storage unit 73. In particular, the energy storage unit 73 is coupled to the output terminals 56c, 56d of the buck output filter unit 72. The high power output terminal 53 is coupled to the output terminal 55c of the buck-boost input filter unit 71 and the low power output terminal 54 is coupled to the low voltage node 58 of the half bridge unit 70 (in which the second inductor is indicated by Lc instead of Lo here to indicate that the second inductor Lc is coupled in series with Cs here, while Lo is coupled to Co in the first and second embodiments.

A fourth embodiment of a driver device 50d according to the present invention is schematically shown in FIG. 4b. This embodiment is substantially identical to the embodiment of the driver device 50b, but also in this embodiment the position of load 22 (together with the output decoupling capacitor Co) is exchanged with the position of the energy storage unit 73. The energy storage unit is coupled to the output terminals 56c, 56d of the buck output filter unit 72. The high power output terminal 53 is coupled to the output terminal 55c of the buck-boost input filter unit 71 and the low power output terminal 54 is coupled to the low voltage node 58 of the half bridge unit 70.

Thus, according to the third and fourth embodiments the load 22 is connected at the output of the buck-boost converter (i.e. in parallel to Co and between the source electrode of the bottom switching element 61 and ground). The low frequency storage capacitor Cs is connected at the output of the buck converter (i.e. in series to inductor Lc), which operates in bidirectional mode, thereby enabling full ZVS operation in both switches.

Figure 8:
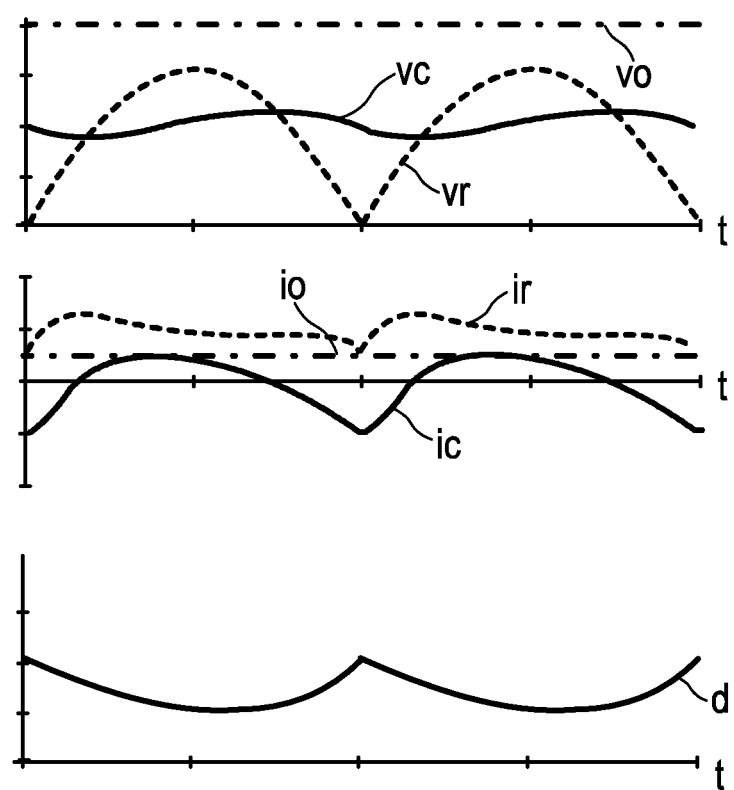
FIG. 8 shows diagrams of voltages and currents during one low frequency cycle in an embodiment of the second configuration of the proposed driver device.
Figure 9:
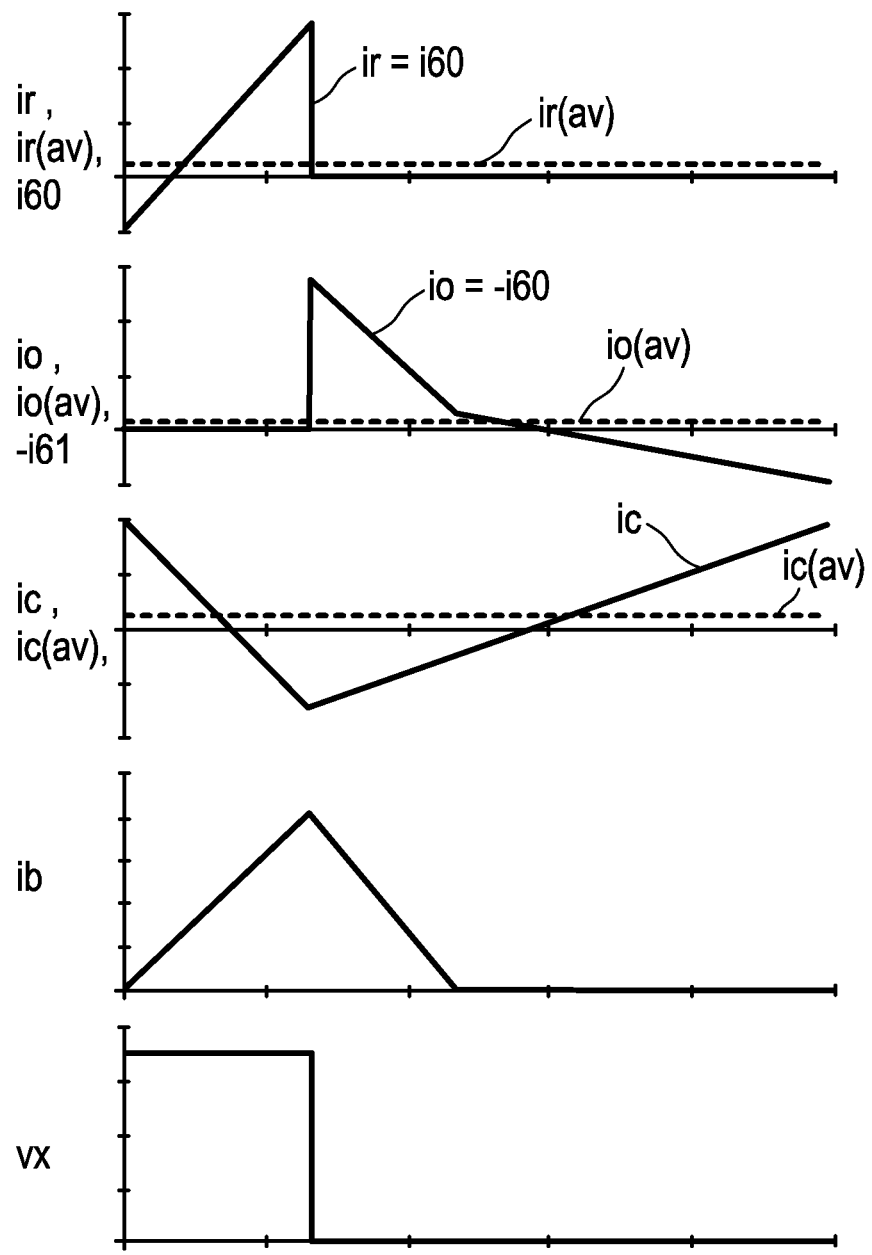
FIG. 9 shows diagrams of various currents during one high frequency cycle in an embodiment of the second configuration of the proposed driver device.

FIGS. 8 and 9 show signal diagrams of the third embodiment for an embodiment of a driver device 50c as shown in FIG. 4a during one mains cycle. For the example of the steady-state waveforms shown in FIG. 8 and the high-frequency waveforms at phase angle $\pi/2$ from mains cycle shown in FIG. 9 the following values apply: vm=220 Veff, 50 Hz, 1 MHz switching frequency, Lm=200 µH, Lc=400 µH, Po=10 W, vo=400V, Cs=2 µF, PF=91%, THD=44%, maximum voltage stress across switches=711V. The term "av" refers to the average component over a switching cycle. d indicates the duty cycle.

The ZVS operation is shown in the high frequency switching waveforms of FIG. 9 for the case of $\pi/2$ phase angle corresponding to the mains cycle. Capacitors Cm and Co filter these high switching frequency signals to prevent them at the input and output, respectively. The maximum voltage stress across the switches is the sum of both the rectified supply voltage and the load voltage.

As depicted in FIG. 8, the configuration is characterized by the use of low frequency storage capacitors rated at voltages substantially lower than the rectified supply voltage peak. Such capacitor can be as low as 2 µF (i.e. 200 nF/W) and still guarantee constant output power and a high power factor. On the other hand, the load voltage must be higher than the supply peak voltage (e.g. 400V in case of European mains supply). The rectified input current it never falls to zero due to the continuous current flow from the input voltage supply vm directly to the low frequency storage capacitor Cs.

A fifth embodiment of a driver device 50e according to the present invention is schematically shown in FIG. 5a. This embodiment is substantially identical to the embodiment of the driver device 50c, but here in this embodiment the buck output filter unit 72 is coupled to the first switching element 60, i.e. the input terminals 56a, 56b of the buck output filter unit 72 are coupled to the high voltage node 57 and the intermediate node 59 of the half bridge unit 70. The second inverter Lc is provided in this embodiment in the connection between the second input terminal 56b and the second output terminal 56d of the buck output filter unit 72. It should also be noted that bridge rectifier 62' is bidirectional, as opposed to the previous embodiments where the bridge rectifier 62 generally is unidirectional.

A sixth embodiment of a driver device 50f according to the present invention is schematically shown in FIG. 5e. This embodiment is substantially identical to the embodiment of the driver device 50d, but in this embodiment the buck output filter unit 72 is coupled to the second switching element 61, i.e. the input terminals 56a, 56b of the buck output filter unit 72 are coupled to the intermediate node 59 and the low voltage node 58 of the half bridge unit 70. Also in this embodiment the bridge rectifier 62' is bidirectional like in the fifth embodiment.

Thus, according to the fifth and sixth embodiments the load is connected at the output of the buck-boost converter (i.e. in parallel to Co and between the source electrode of the bottom switching element 61 and ground). The low frequency storage capacitor Cs is connected at the output of the buck converter (i.e. in series to inductor Lc), which operates in bidirectional mode, thereby enable full ZVS operation in both switches.

Figure 10:
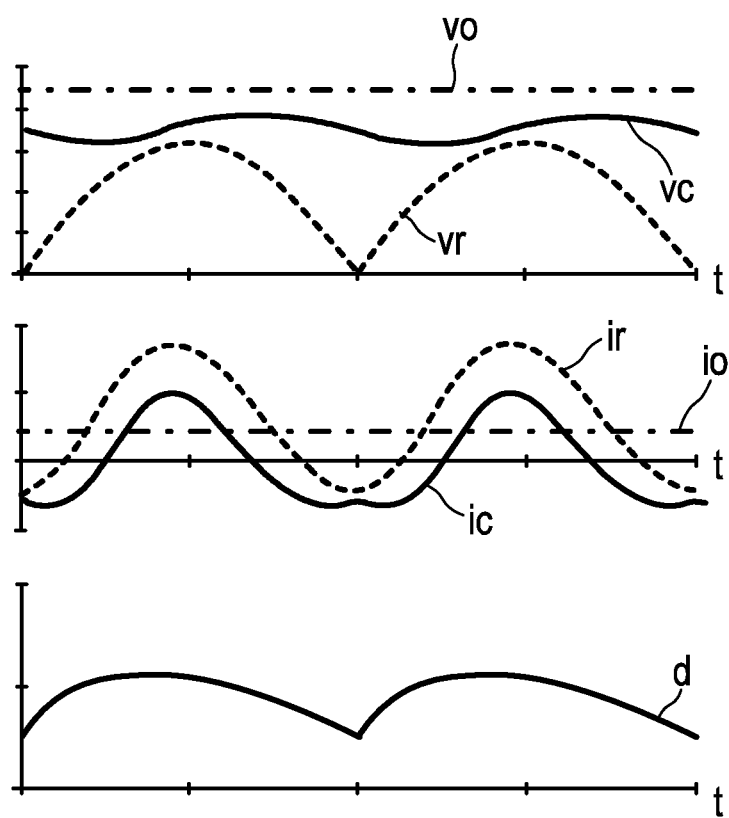
FIG. 10 shows diagrams of voltages and currents during one low frequency cycle in an embodiment of the third configuration of the proposed driver device.
Figure 11:
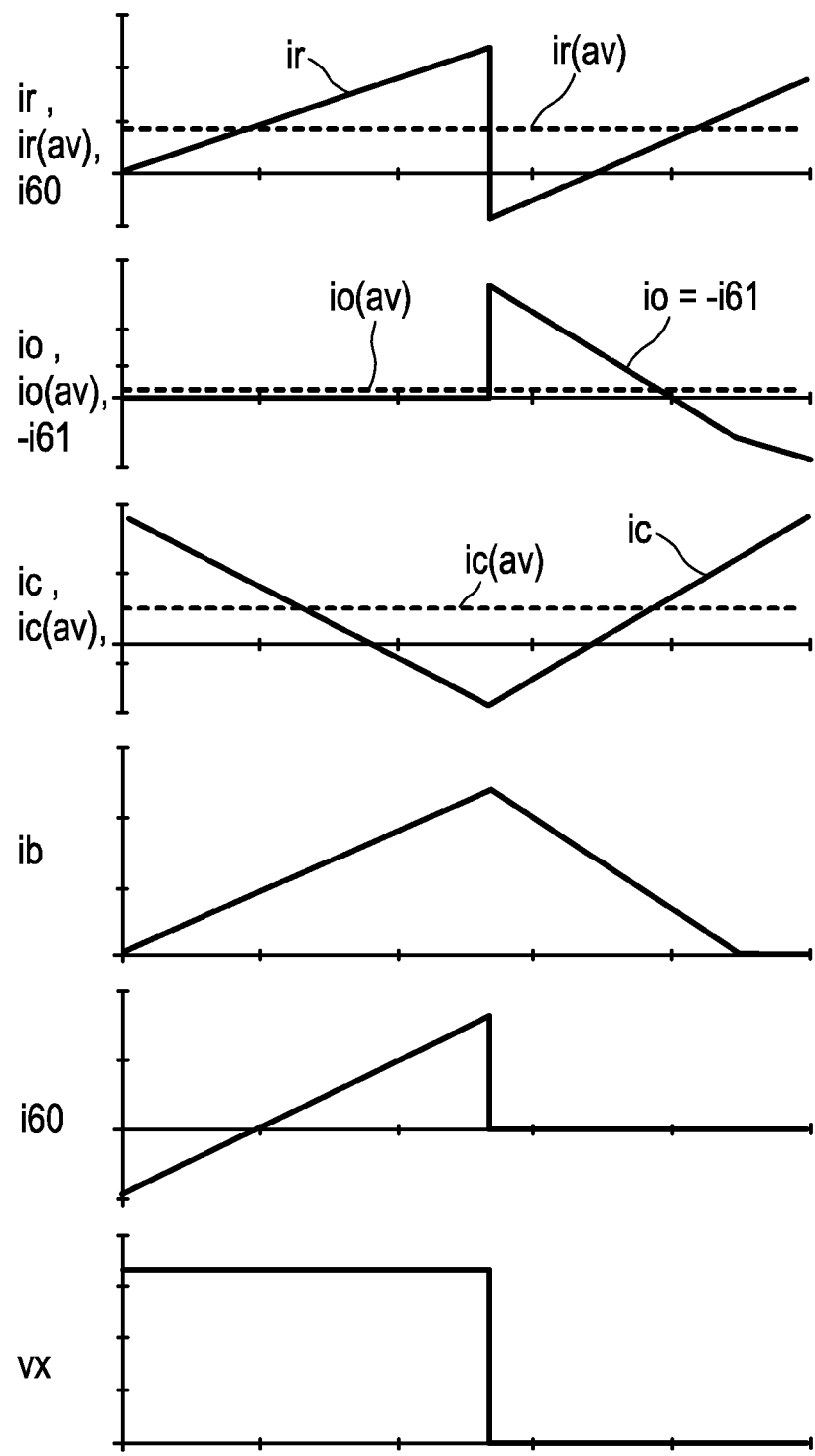
FIG. 11 shows diagrams of various currents during one high frequency cycle in an embodiment of the third configuration of the proposed driver device.

FIGS. 10 and 11 show signal diagrams of the third embodiment for an embodiment of a driver device 50e as shown in FIG. 5a during one mains cycle. For the example of the steady-state waveforms shown in FIG. 10 and the high-frequency waveforms at phase angle $\pi/2$ from mains cycle shown in FIG. 11 the following values apply: vm=220 Veff, 50 Hz, 1 MHz switching frequency, Lm=Lc=700 µH, Po=10 W, vo=450V, Cs=2 µF, PF=90%, THD=47%, maximum voltage stress across switches=761V. The term "av" refers to the average component over a switching cycle. d indicates the duty cycle.

The ZVS operation is shown in the high frequency switching waveforms of FIG. 11 for the case of $\pi/2$ phase angle corresponding to the mains cycle. Capacitors Cm and Co filter these high switching frequency signals. The maximum voltage stress across the switches is the sum of both the rectified supply voltage and the load voltage.

As depicted in FIG. 10, this configuration is characterized by the use of low frequency storage capacitors rated at voltages higher than the rectified supply voltage peak. Such capacitor can be as low as 2 µF (i.e. 200 nF/W) and still guarantee a constant output power and a high power factor. The load voltage must be higher than the supply peak voltage (e.g. 450V in case of European mains supply). The rectified input current it falls to zero and go negative, thus implying the use of bidirectional rectifier bridges (see FIGS. 5a, 5b) in case of mains rectification.

Figure 12:
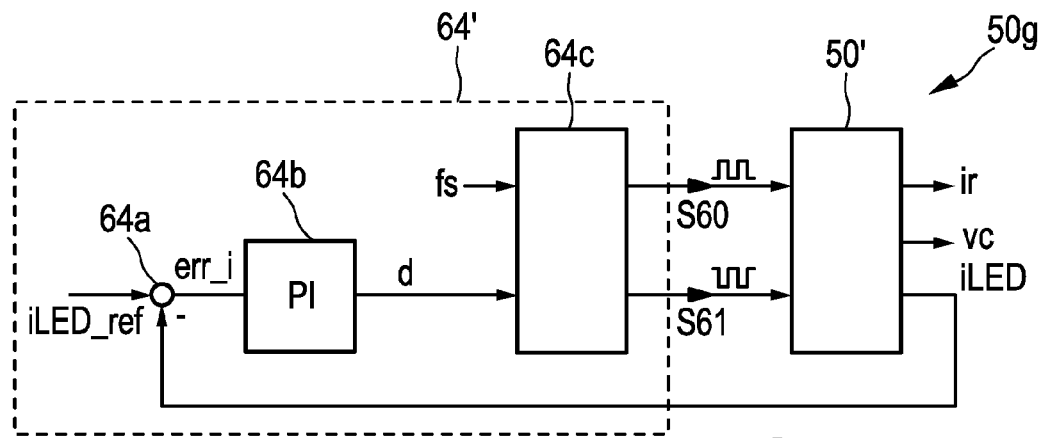
FIG. 12 shows a first embodiment of a control unit of the proposed driver device.

Next, the control method and device according to the present invention shall be explained. FIG. 12 shows another embodiment of a driver device 50g including a first embodiment of the control unit 64' (the other parts of the driver device are schematically indicated by a single block 50'). The LED current iLED is measured and compared to a (preset or variable) reference current iLED_ref in a comparison element 64a. The control error err_i is processed in a controller block 64b (indicated by PI) resulting in the duty cycle d as manipulating variable. Together with preset switching frequency fs gate driving signals, representing the control signals S60, S61 for both switching elements 60, 61, are formed in a (gate) driver block 64c.

Figure 13:
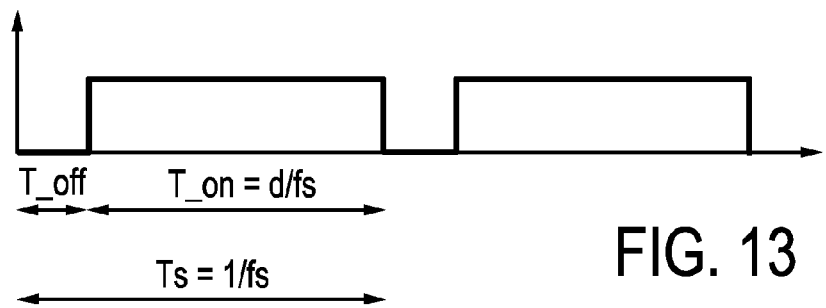
FIG. 13 shows the switching signal of a first switching element of the half bridge unit.

FIG. 13 shows a timing diagram for the (gate of the) the switching element 60.

The duty cycle is basically related to the control error as typically done in a buck converter. Regarding the embodiments of the driver device 50g, a positive control error err_i (to little current) causes an increase of d and vice versa.

Self stabilizing behavior is achieved by the arrangement of the boost input filter unit with respect to the terminals of the buck output filter unit. If e.g. more power is drawn in average from the input than is taken from the output, the bus voltage will increase which in response will cause the control to decrease d, which in turn will reduce input power. In same manner the other embodiments can be operated, wherein the meaning of the duty cycle is toggled, i.e. d is to be replaced by 1−d for the embodiments of the driver device 50b, 50d, 50f compared to the embodiment of the driver device 50a, 50c, 50e. Other operation characteristics as the bus voltage and mains current (PF) are generally not explicitly controlled. They result from design and operation choices and tolerances.

In a further embodiment the maximum bus voltage is also explicitly controlled by means of the control, in particular by manipulating also the switching frequency. While still manipulating d to control the output current, fs is increased in response to an increasing bus voltage (as a result e.g. of a high mains voltage or a high output voltage). Alternatively, it is also possible to separately control T_on and T_off, which however will result in a similar switching pattern.

To avoid too high bus voltages (i.e. to avoid over boosting) in case the reference signal iLED_ref is variable and reduced far below its rated max. value, in a further embodiment the control enters a burst mode, i.e. switches off the converter periodically at a burst frequency below fs (e.g. 10 to 1000 times). Furthermore, and alternatively to frequency modulation for bus voltage control, fs can be used to shape the input current, either to improve the PF or to better comply with certain kinds of wall plug dimmers.

Figure 14:
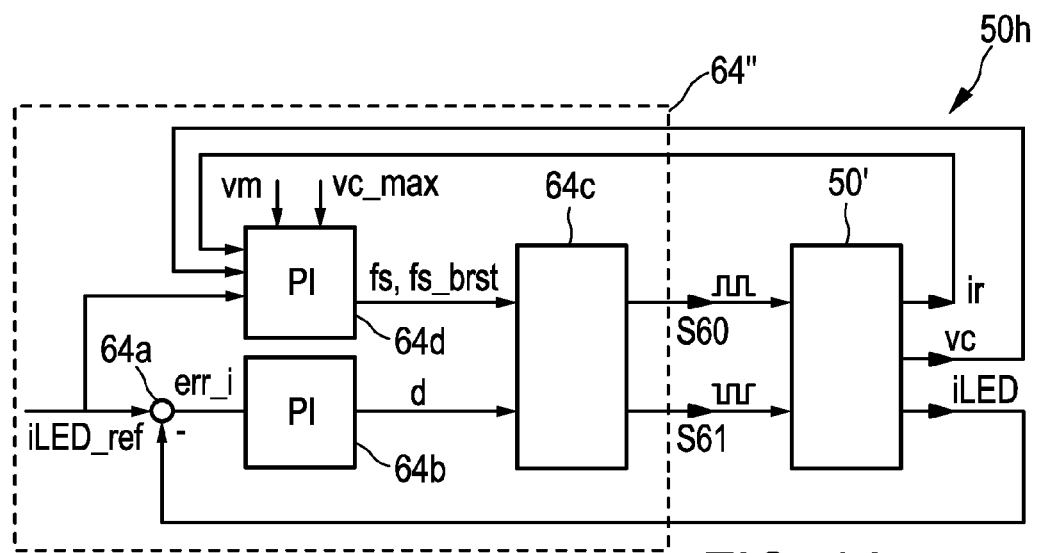
FIG. 14 shows a second embodiment of a control unit of the proposed driver device.

Still another embodiment of a driver device 50h including a first embodiment of the control unit 64" is depicted in FIG. 14. Compared to the embodiment shown in FIG. 12 the control unit 64" additionally comprises a second controller block 64d (indicated by PI) resulting in the switching frequency fs and fs_brst as manipulating variable provided to the (gate) driver block 64c. The second controller block 64d receives as input the reference current iLED_ref, the bus voltage vc, the input current ir, the input voltage vm and the maximum bus voltage vc_max.

According to the present invention a driver device is proposed according to which a buck-boost converter is integrated into a synchronous buck converter. The two ends are connected to a load, e.g. an HV LED load, and to an energy storage unit, e.g. a small low frequency capacitor, which gives both constant LED current and power factors of 0.9 or higher. The separate capacitor voltage level allows minimizing the stored energy. The buck-boost converter current arranges for lossless inverter switching, which means high efficiency even at miniaturized inductors.

There are at least three advantageous configurations of the buck-boost integrated synchronous buck converter that cope with various load and input voltage ranges including universal mains. All of them can be controlled over wide load ranges by means of manipulating the duty cycle only or the switching frequency or by bursting.

The embodiments 50a, 50b of the driver device are mainly suited for load (LED string) voltages higher than peak supply voltage, e.g. for 120V mains supply and 250V LED strings. The embodiments 50c, 50d are mainly suited for load (LED string) voltages far lower than peak supply voltage, e.g. for 120V or 230V mains and LED string voltages 10 . . . 150V. These embodiments show low root mean square (rms) currents in filters and inverter. The embodiments 50e, 50f are mainly suited for applications like embodiments 50c, 50d. These embodiments show reduced voltage stress on bus capacitor at somewhat increased rms currents in filters and inverter.

In some embodiments a single ZVS half bridge converter and two inductors (i.e. a buck-boost and a buck converter) are provided. The switch node is preferably connected to rectified mains via a buck-boost inductor and diode that enforces discontinuous conduction mode in the buck-boost inverter. The switch node is further connected to a buck inductor.

The buck converter output can be the low frequency storage capacitor or the load (e.g. a high voltage string of LEDs), depending on the configuration. The input power supply, e.g. a rectifier mains, can be connected at the input or output of the buck-boost converter depending on the chosen format. Either only the LED current is controlled constant (e.g. by duty cycle) or both LED current and bus voltage are controlled in two loops with manipulating the frequency, too. Preferably, two high frequency decoupling capacitors for the converter's input and/or output are provided.

The present invention is applied in consumer and "prosumer" (professional consumer) drivers, as LED drivers, above 2W, e.g. either integrated into a luminaire or external for HV LEDs. Further applications are non-mains isolated professional drivers with relaxed THD requirement (e.g. 20%) and HV LED string loads.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A driver device for driving an LED unit comprising one or more LEDs, said driver device comprising:
   power input terminals for receiving a rectified supply voltage from an external power supply,
   power output terminals for providing a drive voltage and/or current for driving a load,
   a half bridge unit comprising a first and second switching element coupled in series between a high voltage node and a low voltage node and having a switch node between said first and second switching elements,
   a buck-boost input filter unit comprising a first inductor and a series diode coupled between a power input terminal and said half bridge unit,
   a buck output filter unit comprising a second inductor coupled between said half bridge unit and a power output terminal,
   an input decoupling capacitor coupled between the power input terminals,
   an output decoupling capacitor coupled between the power output terminals, wherein the output decoupling capacitor is in parallel with the load, and
   a control unit for controlling said switching elements, and
   an energy storage unit coupled between either a low power input terminal and said low voltage node of said half bridge unit, or a high power input terminal and said high voltage node of said half bridge unit;
   wherein the driver device is configured for zero voltage switching of the first and second switching elements.

2. The driver device as claimed in claim 1, wherein a high power input terminal is coupled to the high voltage node of the half bridge unit and a low power input terminal is coupled to the buck-boost input filter unit.

3. The driver device as claimed in claim 2, wherein an input terminal of said buck-boost input filter unit is coupled to the low power input terminal and wherein the output terminal of said buck-boost input filter unit is coupled to the switch node of the half bridge unit.

4. The driver device as claimed in claim 1, wherein the input terminal of said buck-boost input filter unit is coupled to the energy storage unit or the low power output terminal and wherein the input and output terminals of said buck-boost input filter unit are coupled to the switch node of the half bridge unit and the low power input terminal.

5. The driver device as claimed in claim 1, wherein said energy storage unit comprises a charge capacitor.

6. The driver device as claimed in claim 1, further comprising a rectifying unit for rectifying an AC supply voltage, in particular a mains voltage, into said rectified supply voltage.

7. The driver device as claimed in claim 1, wherein the control unit is configured to keep an output current of the half bridge unit constant, the voltage across said energy storage unit below a predetermined threshold.

8. A light apparatus comprising:
   a light assembly comprising one or more LED units comprising one or more LEDs; and
   a driver device for driving said light assembly as claimed in claim 1.

* * * * *